United States Patent [19]

Martin

[11] 4,444,427
[45] Apr. 24, 1984

[54] AUXILIARY STRUCTURAL ELEMENTS FOR A PICKUP TRUCK

[76] Inventor: John A. Martin, P.O. Box 19054, Oklahoma City, Okla. 73144

[21] Appl. No.: 376,516

[22] Filed: May 10, 1982

[51] Int. Cl.³ .............................................. B60P 7/06
[52] U.S. Cl. ........................................ 296/43; 296/3; 296/10; 296/167; 224/42.42
[58] Field of Search ................... 296/43, 3, 10, 1 R, 296/35.3, 156, 167; 224/42.42 R X; 248/346, 310, 678, 176

[56] References Cited

U.S. PATENT DOCUMENTS

| | | | |
|---|---|---|---|
| 582,814 | 5/1897 | Emrich | 296/52 |
| 761,676 | 6/1904 | Holbrook | 296/3 |
| 1,425,596 | 8/1922 | Kramer | 296/180 |
| 1,510,798 | 10/1924 | Poe | 296/52 |
| 1,576,976 | 3/1926 | Jackson et al. | 296/52 |
| 1,671,848 | 5/1928 | Wallace et al. | 296/3 |
| 1,764,615 | 6/1930 | Edwards | 296/50 |
| 2,129,438 | 9/1938 | Nitsche | 296/10 |
| 2,365,940 | 12/1944 | Couse | 296/24 |
| 2,530,866 | 11/1950 | Evans et al. | 280/33 |
| 2,591,380 | 4/1952 | Schreiner | 296/28 |
| 2,639,187 | 5/1953 | Grumbache | 296/37 |
| 2,720,414 | 11/1955 | Hart | 296/12 |
| 2,729,501 | 1/1956 | Van Doorne et al. | 296/66 |
| 2,801,130 | 7/1957 | Booker | 296/12 |
| 2,934,248 | 4/1960 | Lown | 224/42.42 |
| 3,069,199 | 12/1962 | Reardon et al. | 296/100 |
| 3,093,403 | 6/1963 | Sumrall | 296/10 |
| 3,163,462 | 12/1964 | Valesky | 296/28 |
| 3,574,391 | 4/1971 | Doboze | 296/36 |
| 3,594,035 | 7/1971 | Ferguson | 296/3 |
| 3,613,920 | 10/1971 | Flamm | 214/85 |
| 3,664,704 | 5/1972 | Ellis | 296/24 R |
| 3,765,713 | 10/1973 | Suitt | 296/3 |
| 3,841,690 | 10/1974 | Piercy | 296/10 |
| 3,966,250 | 6/1976 | Winskas | 296/1 R |
| 4,079,989 | 3/1978 | Robertson | 296/100 |
| 4,199,186 | 4/1980 | Faverino | 296/13 |
| 4,215,898 | 8/1980 | Ulics | 296/183 |
| 4,267,948 | 5/1981 | Lewis | 296/3 |
| 4,268,083 | 5/1981 | Carpenter | 296/10 |

*Primary Examiner*—Richard R. Song
*Attorney, Agent, or Firm*—Dunlap & Codding

[57] ABSTRACT

A support apparatus for auxiliary structural elements in a pickup truck. First and second frame members, each having a support element, a retaining element and a plurality of upwardly opening frame pockets, are supported on each sidewall of the pickup truck. Third and fourth frame members, similar in construction to the first and second frame members, are supported at opposite ends by the first and second frame members. The frame members form a deck-supporting enclosure in which an auxiliary deck may be clearingly lowered and received. The frame pockets of each frame member form a side-supporting structure in which a vertically disposed auxiliary side element may be clearingly lowered and received.

13 Claims, 13 Drawing Figures

AUXILIARY STRUCTURAL ELEMENTS FOR A PICKUP TRUCK

FIELD OF THE INVENTION

The present invention relates generally to auxiliary decks and side elements supported by the cargo compartment of a pickup truck.

SUMMARY OF THE INVENTION

The present invention comprises a support apparatus for auxiliary structural elements in a pickup truck of the type having a front wall, and a pair of opposed first and second sidewalls, each having an upper surface. First and second frame members, each having a support element, a retaining element and a plurality of upwardly opening frame pockets, are supported on each sidewall. The frame pockets of each frame member form a side-supporting structure in which the projecting leg members of an auxiliary side element may be clearingly lowered and received.

Third and fourth frame members are supported at opposite ends by the first and second frame members. Each of the third and fourth frame members has a support element and a retaining element. The support and retaining elements of the first, second, third and fourth frame members cooperate to form a deck-supporting enclosure, in which an auxiliary deck may be clearingly lowered and received.

DESCRIPTION OF THE PREFERRED EMBODIMENTS

Figure 1:
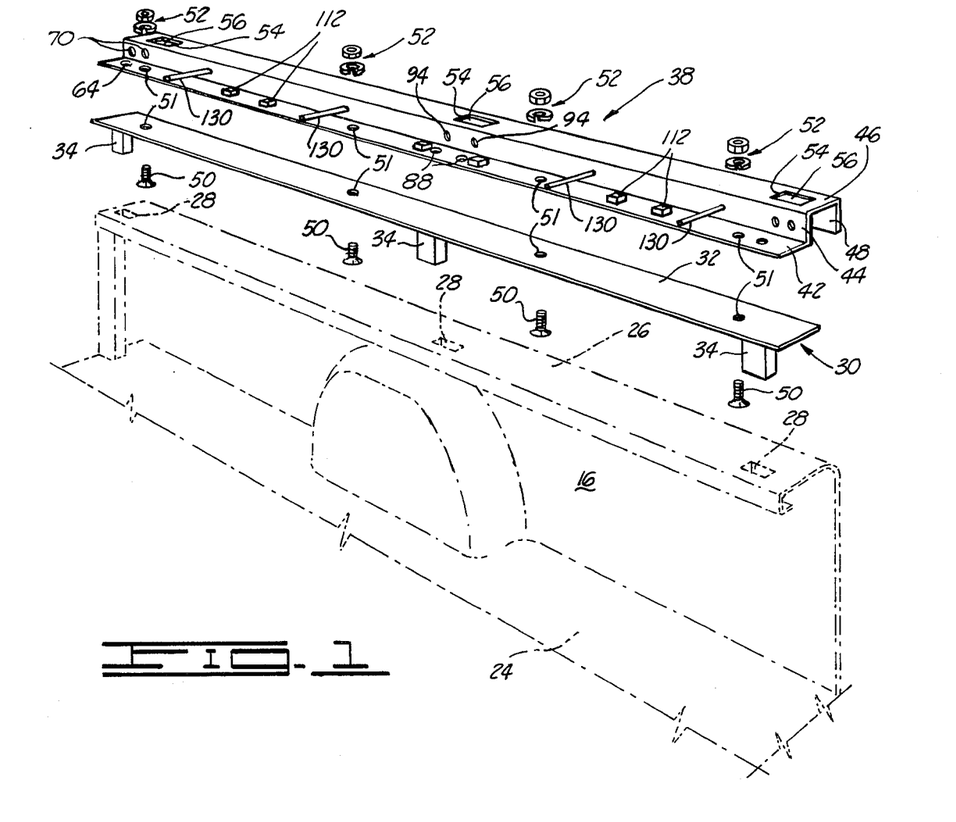
FIG. 1 is an isometric view showing, in exploded form, the components of the first frame member of the present invention.
Figure 2:
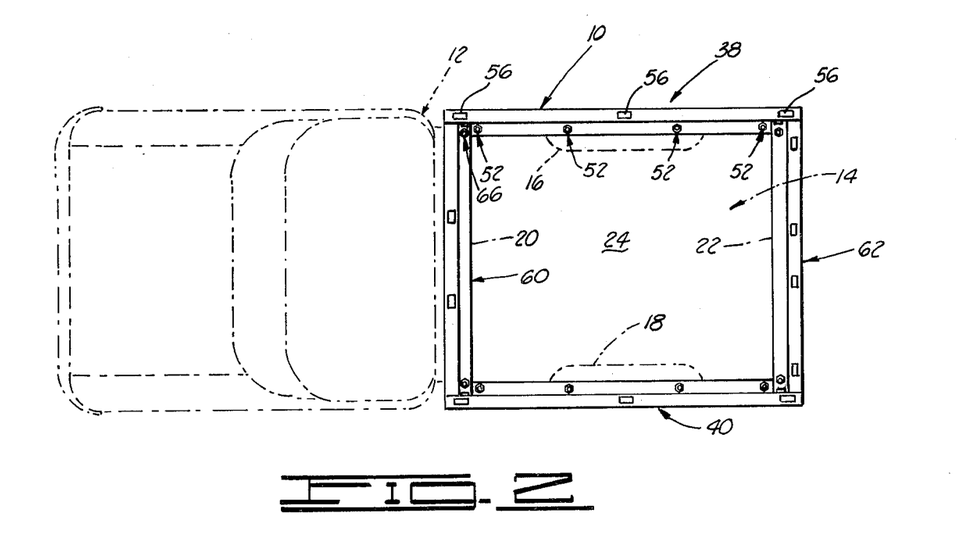
FIG. 2 is a plan view of the support assembly of the present invention, including the first, second, third and fourth frame members.

With reference to FIGS. 1 and 2, the present invention comprises a support assembly, generally designated by reference number 10, for auxiliary structural elements in a pickup truck 12. The pickup truck 12, best shown in FIG. 2, features a cargo compartment 14 defined by a first sidewall 16, an opposed second sidewall 18, a front wall 20, a rear gate 22, and a bed 24.

As shown in FIG. 1, the first sidewall 16 is characterized by a planar upper surface 26 in which are formed a plurality of sidewall pockets 28. Although not shown in detail in the Figures, the second sidewall surface 18 is likewise characterized by a planar upper surface in which a plurality of sidewall pockets are formed.

With reference to FIG. 1, the support assembly 10 comprises a first base member 30 having a planar platform element 32, preferably formed from steel. Extending from the underside of the platform element 32 are a plurality of insert members 34. The platform element 32 rests on the upper surface 26 of the first sidewall 16, with each insert member 34 being received in a corresponding sidewall pocket 28. The insert members 34 may be secured within the sidewall pockets 28 by bolts, thus securing the first base member 30 to the first sidewall 16.

Figure 5:
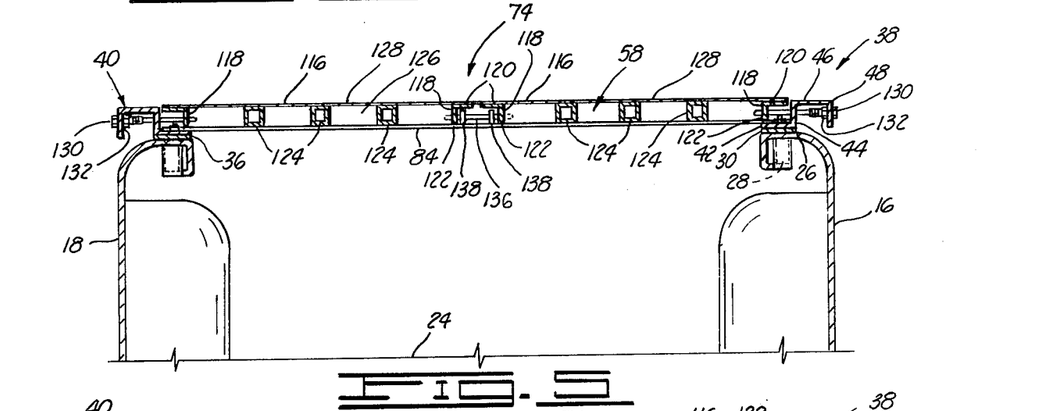
FIG. 5 is a cross-sectional view of the auxiliary deck shown in FIG. 3, taken along line 5—5. The rear panel members have not been removed in this view.
Figure 6:
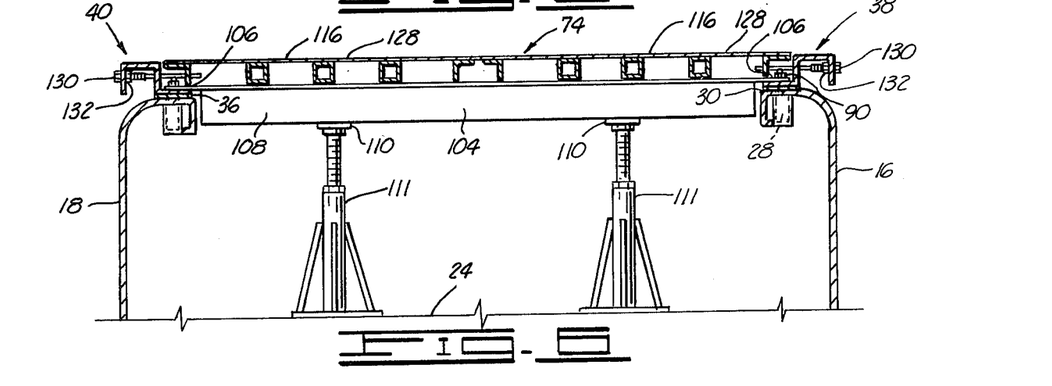
FIG. 6 is a cross-sectional view of the auxiliary deck shown in FIG. 3, taken along line 6—6. The rear panel members have not been removed in this view.

A second base member 36, best shown in FIGS. 5 and 6, is secured to the second sidewall 18; like the first base member 30, the second base member 36 comprises a planar platform element and a plurality of insert members extending from the underside of the platform element. The platform element rests on the upper surface of the second sidewall 18, with each insert member being received in a corresponding sidewall pocket. The insert members may be secured within the sidewall pockets by bolts, thus securing the second base member 36 to the second sidewall 18.

In the event that there are no sidewall pockets formed in the upper surface of the sidewalls of the pickup truck, it may not be possible to secure the type of base member just described into resting disposition on the upper surface of each sidewall. In this event, the base member may comprise a planar platform member in edgewise engagement with an extension member. The platform member is rested on the upper surface of the sidewall, with an extension member extending toward the bed, adjacent the interior portion of the sidewall. The extension member may be secured to the structural member forming the upper surface of the sidewall by brackets carried on the extension member.

Returning to FIGS. 1 and 2, the support assembly 10 further comprises a first frame member 38 and a second frame member 40. As shown in FIG. 1, the first frame member 38 comprises a planar support element 42, disposed adjacent the bed 24, and a planar retaining element 44 disposed in edgewise engagement with the support element 42 and extending perpendicularly from the support element 42. Further comprising the first frame member 38 is a ledge element 46 disposed in edgewise engagement with the retaining element 44 and extending perpendicularly to the retaining element 44 and away from the support element 42. The first frame member 38 further comprises a planar closure element 48 disposed in edgewise engagement with the ledge element 46 and extending perpendicularly to the ledge element 46 and toward the support element 42.

The elements 42, 44, 46 and 48 making up the first frame member 38 are formed from a strong, durable material, such as steel. If desired, the first frame member 38 may be conveniently formed by welding together a pair of L-shaped angle members to produce the required configuration.

With reference to FIGS. 1 and 5, the support element 42 of the first frame member 38 rests on the platform element 32, which is in turn supported by the upper surface 26 of the first sidewall 16. The support element 42 is secured to the platform element 32 by countersunk bolts 50 which extend from the underside of the platform element 32, and through apertures 51 formed in the platform element 32 and the support element 42. A lock washer and nut assembly 52 is secured to each bolt 50, and secures the platform element 32 to the first base member 30.

With reference to FIGS. 1 and 2, formed in the ledge element 46 are a plurality of openings 54, each opening communicating with an upwardly opening frame pocket 56. The plurality of frame pockets 56 formed in the ledge element 46 form a side-supporting structure, in which the projecting leg members of an auxiliary side element may be clearingly lowered and received, as will be described in greater detail hereafter.

As shown in FIGS. 2, 5 and 6, the second frame member 40 is identical in construction to the first frame member 38, comprising a support element, a retaining element, a ledge element and a closure element. The support element of the second frame member 40 rests upon, and is secured to the platform element of the second base member 36, which is in turn supported by the upper surface of the second sidewall 18. The second frame member 40 is oriented so that its support member is adjacent the bed 24 of the pickup truck 12. Formed in the ledge element of the second frame member 40 are openings which communicate with upwardly opening frame pockets which, like the frame pockets in the first frame member 38, form a side-supporting structure for an auxiliary side element.

As best shown in FIG. 5, the support and retaining elements 42 and 44 of the first frame member 38, and the support and retaining elements of the second frame member 40 form a deck-supporting enclosure 58 in which an auxiliary deck may be clearingly lowered and received, as will be described in greater detail hereafter. The retaining elements function to restrict side-to-side movement by the auxiliary deck, while the support elements function to support the auxiliary deck.

Figure 7:
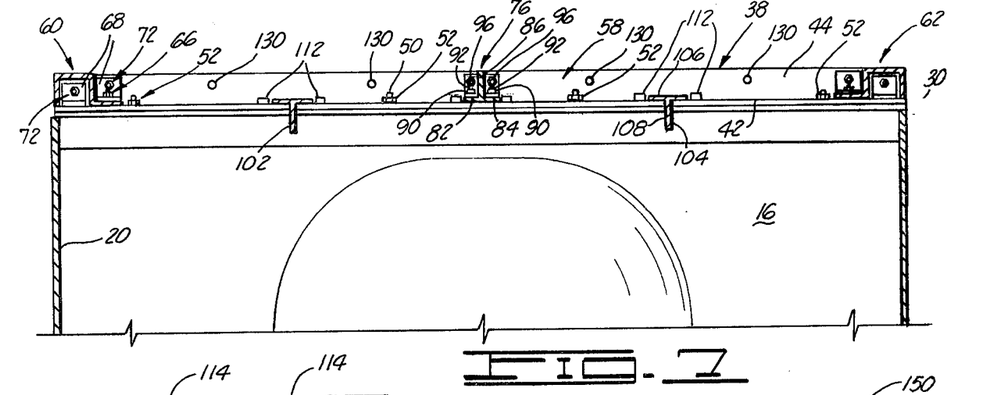
FIG. 7 is a cross-sectional view of the auxiliary deck shown in FIG. 3, taken along line 7—7.

With reference to FIGS. 2 and 7, the support assembly 10 further comprises a third frame member 60 and a fourth frame member 62. The third frame member 60 comprises a support element disposed adjacent the bed 24, a retaining element, a ledge element and a closure element. The fourth frame member 62 comprises at least a support element disposed adjacent the support element of the third frame member 60, and a retaining element, and preferably further comprises a ledge element and a closure element. The support, retaining, ledge and closure elements of the third and fourth frame members 60 and 62 are oriented and disposed in a manner identical to that previously described with reference to the first and second frame members 38 and 40, as is best shown in FIG. 7. The third and fourth frame members 60 and 62 are preferably constructed from the same materials as the first and second frame members 38 and 40.

Formed in the ledge surface of each of the third frame member 60 and the fourth frame member 62 are a plurality of openings, each of which communicate with an upwardly opening frame pocket. The frame pockets in each of the frame members 60 and 62, like the frame pockets in the frame members 38 and 40, form a side-supporting structure for an auxiliary side element.

As shown in FIG. 2, the third frame member 60 is supported at opposite ends by the support elements of the first and second frame members 38 and 40, and is disposed adjacent the front wall 20 of the pickup truck 12. Preferably, the third frame member 60 is supported on that portion of the first and second frame members 38 and 40 nearest the front wall 20.

Turning to FIG. 7, the third frame member 60 is secured to the first frame member 38 by a countersunk bolt extending from the underside of the support element 42, through an aperture 64 (shown in FIG. 1) formed in the support element 42, and through a corresponding aperture formed in the support element of the third frame member 60. The bolt is secured to the two support elements by a lock washer and nut assembly 66 (shown in FIGS. 2 and 7).

A flat plate member 68, shown in FIG. 7, is secured to the end of the third frame member 60 adjacent the first frame member 38, and is disposed in perpendicular orientation to the support, retaining, ledge and closure elements of the third frame member 60. The first plate member 68 is preferably formed from a strong, durable material such as steel, and is preferably welded to the end of the third frame member 60.

The plate member 68 is disposed in adjacent and parallel relationship to the retaining element 44 of the first frame member 38. The plate member 68 is secured to the retaining element 44 by a pair of bolts which extend, through apertures 70 formed in the retaining element 44 (shown in FIG. 1), and through corresponding apertures formed in the plate member 68. Each bolt is secured to the plate member 68 and retaining element 44 by a lock washer and nut assembly 72, best shown in FIG. 7.

The end of the third frame member 60 adjacent the second frame member 40 is secured to the second frame member 40 in a manner identical to that just described with reference to the end of the third frame member 60 adjacent the first frame member 38. Thus the support elements of the second and third frame members 40 and 60 are secured together by a bolt extending from the underside of the support element of the second frame member 40, and the retaining element of the second frame member 40 is secured by a pair of bolts to a plate member secured to the end of the third frame member 60 disposed adjacent the second frame member 40. Lock washer and nut assemblies are provided to hold the bolts in place.

With continued reference to FIGS. 2 and 7, the fourth frame member 62 is supported at opposite ends by the support elements of the first and second frame members 38 and 40. The fourth frame member 62 is disposed in a position remote from the front wall 20 of the pickup truck 12, and is preferably disposed on that portion of the first and second frame members 38 and 40 nearest the rear gate 22. The fourth frame member 62 is secured to the first and second frame members 38 and 40 in a manner identical to that previously described with reference to the third frame member 70—that is, the support elements of adjacent frame members are secured by a bolt and lock washer and nut assembly, the retaining element 44 of the first frame member 38 is secured by bolts, lock washers and nuts to a plate member disposed at one end of the fourth frame member 62, and the retaining element of the second frame member 40 is secured to a plate member disposed at the opposite end of the fourth frame member 62.

The support and retaining elements of the third and fourth frame members 60 and 62 cooperate with the support and retaining elements of the first and second frame members 38 and 40 to form the deck-supporting enclosure 58 in which an auxiliary deck may be clearingly lowered and received. As best shown in FIG. 7, the support elements of the third and fourth frame members 60 and 62 support the auxiliary deck, while the retaining elements of the third and fourth frame members 60 and 62 operate to restrict front-to-rear and rear-to-front movement by the auxiliary deck.

With regard to the first and second frame members 38 and 40, it will be noted that they may be employed in any pickup truck of a given front-to-rear bed length. Likewise, with regard to the third and fourth frame members 60 and 62, it will be noted that they may be employed in any pickup truck of a given side-to-side bed width. This characteristic of the frame members often permits adaptation of the support assembly 10 to another model of pickup truck without replacement of all of the frame members.

Shown in FIGS. 3-9 is one embodiment of the auxiliary deck of the present invention, supported on the support assembly 10 previously described. In the embodiment of FIGS. 3-9, the auxiliary deck, generally designated by reference numeral 74, comprises four panel members. The construction of the auxiliary deck will be described in detail hereafter; initially, however, additional features of the support assembly 10 in the embodiment of FIGS. 3-9 will be described.

Figure 3:
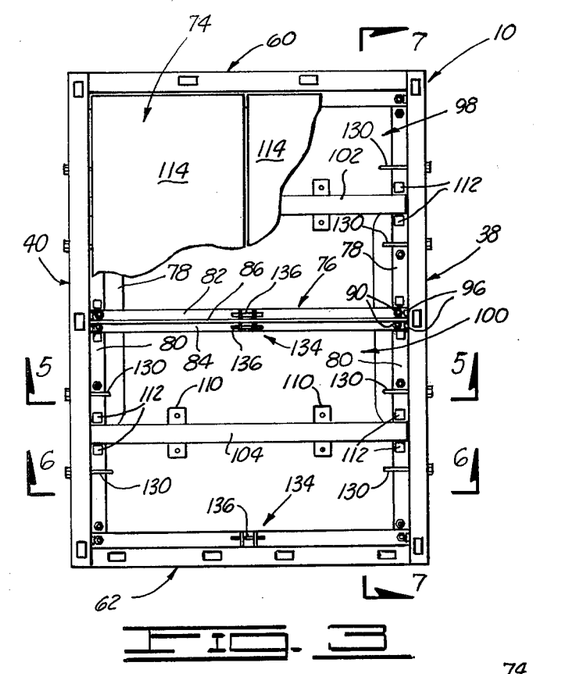
FIG. 3 is a plan view of the auxiliary deck of the present invention, in an embodiment in which the deck is formed from four panel members. The panel members have been removed and partially cut away in order to permit display of the components of the support and locking assemblies.

With reference to FIGS. 3 and 7, the support assembly 10 further comprises a central frame member 76 supported at opposite ends by the support elements of the first and second frame members 38 and 40. The central frame member 76 is disposed intermediate to the front wall 20 and rear gate 22 of the pickup truck 12, and is preferably disposed to bisect each of the first and second frame members 38 and 40 into a front portion 78 and a rear portion 80, as shown in FIG. 3.

The central frame member 76 preferably comprises a T-shaped angle member, formed from a strong, durable material such as steel. The central frame member 76 comprises a flat front support element 82 and an integral, coplanar, flat rear support element 84. The front and rear support elements 82 and 84 are separated by retaining element 86, extending perpendicularly to the support elements 82 and 84.

With reference to FIGS. 3 and 7, the central frame member 76 is secured to the first frame member by a pair of countersunk bolts extending from the underside of the support element 42 of the first frame member 38. Each bolt passes through an aperture 88 formed in the support element 42 (shown in FIG. 1), and through a corresponding aperture in either the front support element 82 or the rear support element 84. Each bolt is held in place by a lock washer and nut assembly 90, best shown in FIG. 7.

A flat plate member 92 is secured to the end of the central frame member 76 disposed adjacent the first frame member 38. The plate member 92 is preferably formed from steel, and is secured by welding in perpendicular relationship to the elements 82, 84 and 86 of the central frame member 76. The plate member 92 is secured to the retaining element 44 of the first frame member 38 by a pair of bolts which extend through apertures 94 in the retaining element 44 (shown in FIG. 1), and through corresponding apertures in the plate member 92. Each bolt is held in place by a lock washer and nut assembly 96.

The end of the central frame member 76 disposed adjacent the second frame member 40 is secured to the second frame member 40 in a manner identical to that previously described with reference to the first frame member 38. Thus, the support elements of the central frame member 76 are secured by bolts to the support element of the second frame member 40, and a plate member secured to the end of the central frame member 76 is secured by bolts to the retaining element of the second frame member 40.

The front support element 82 and the retaining element 86 of the central frame member 76, the support and retaining elements of the third frame member 60, and the front portions 78 of the support and retaining elements of the first and second frame member 38 and 40 form a front panel enclosure 98, in which two panels may be clearingly lowered and received, as will be described in greater detail hereafter.

The rear support element 84 and the retaining element 86 of the central frame member 76, the support and retaining elements of the fourth frame member 62 and the rear portions 80 of the support and retaining elements of the first and second frame members 38 and 40 form a rear panel enclosure 100, in which two panel members may be clearingly lowered and received, as will be hereafter discussed in further detail.

With reference to FIGS. 3, 6 and 7, the support assembly further comprises a front brace member 102 and a rear brace member 104, each of which preferably comprises a T-shaped angle member formed from a strong, durable material such as steel. The front brace member 102 is disposed between the central frame member 76 and the third frame member 60, while the rear brace member 104 is disposed between the central frame member 76 and the fourth frame member 62.

As best shown in FIG. 6, the rear brace member 104 comprises a flat base portion 106 and a stem portion 108. The base portion 106 rests at opposite ends on the supporting elements of the first and second frame members 38 and 40. The stem portion 108 projects perpendicularly downward from the base portion 106. Secured to the lowermost extremity of the stem portion 108 is at least one flat bracket member 110, which is preferably formed from metal and is welded to the stem member 108. The bracket member 110 is disposed in substantially perpendicular orientation with respect to the stem member 108. Disposed in adjustable engagement with each bracket member 110 is a portable jack 111, which rests on the bed 24 and provides bracing support for the rear brace member 104.

The front brace member 102 is identical in construction to the rear brace member 104, and likewise comprises a flat base portion, a stem portion and at least one bracket member carried by the stem portion. Portable jacks are provided to bracingly support the front brace member at each bracket member.

Side-to-side movement of the brace members 102 and 104 is restrained by the retaining elements of the first and second frame members 38 and 40. Front-to-rear and rear-to-front movement of the brace members is restrained by stop members 112, which are supported on the supporting elements of the first and second frame members 38 and 40 and are disposed on both sides of each brace member, as shown in FIGS. 1, 3 and 7.

While the embodiment shown in FIGS. 3-9 features two brace members, it should be understood that a larger or smaller number of brace members could be provided, depending on the weight of the auxiliary deck to be supported by the support assembly 10, and on the size of load to be carried in turn by the auxiliary deck.

As noted previously, the auxiliary deck 74 in the embodiment of FIGS. 3-9 comprises four panel members. With reference to FIG. 3, two front panel members 114 (shown in partially cut away form) are received in the front panel enclosure 98; as best shown in FIGS. 5 and 6, two rear panel members 116 are received in the rear panel enclosure 100.

Figure 4:
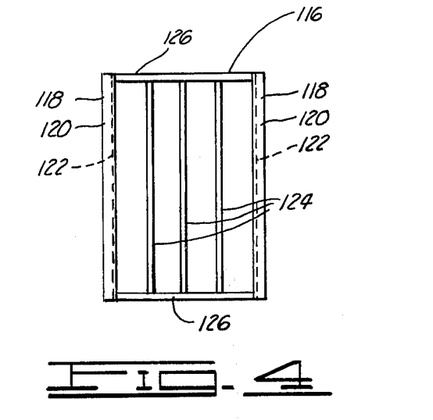
FIG. 4 is a plan view of one of the rear panel members of the auxiliary deck shown in FIG. 3. The deck surface has been removed in order to permit better display of other components of the panel member.
Figure 8:
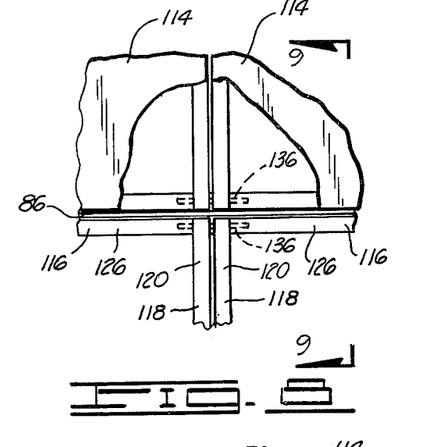
FIG. 8 is an enlarged plan view of the disposition of the four panel members adjacent their point of closest contact. The deck surface has been partially removed in order to permit better display of other components of the invention.

As best shown in FIGS. 4, 5 and 8, each rear panel member 116 comprises a parallel pair of L-shaped angle members 118, each angle member 118 having a flat, projecting upper element 120 and a side element 122 extending perpendicularly to the upper element 120. The upper elements 120 of the angle members 118 project in opposite directions with respect to one another. The angle members are preferably formed from steel.

Disposed between the two angle members 118 are a plurality of cross elements 124 which extend in parallel relationship to the angle members 118. Each cross element 124 preferably comprises a length of hollow steel tubing of square cross-section. Interconnecting the cross elements 124 and angle members 118, at opposite ends thereof, are a pair of terminal elements 124, best shown in FIG. 4. The terminal elements extend in substantially perpendicular relationship to the angle members 118 and cross elements 124, and each preferably comprises a length of hollow steel tubing, of square cross-section. The terminal elements are preferably secured to the ends of the cross elements 124 and the angle members 118 by welding.

From the foregoing, it will be appreciated that the angle members 118, cross elements 124 and terminal elements 126 form a framework for the rear panel member 116. Supported on the upper portion of this framework, on the upper elements of the angle members 118, and on the upper portion of the cross elements 124 and terminal elements 126, is a deck surface 128, which preferably comprises floor steel. The deck surface 128 preferably covers the entire upper portion of the framework, including the terminal elements 126 and the upper elements 120 of the angle members 118.

The front panel members 114 are identical in construction to the rear panel members 116. Thus, each front panel member comprises a pair of angle members, a plurality of cross members, and a pair of terminal members, assembled to form a framework on which a deck surface may be supported.

With reference to FIG. 5, when the rear panel members 118 are received in the rear panel enclosure 100, the panel member disposed adjacent the first frame member 38 is positioned as follows: the side element 122 of one angle member 118 extends along the support element 42 of the first frame member 38, and rests at opposite ends on the rear support element 84 of the central frame member 76 and the support element of the fourth frame member 62. In this position, the side element 122 extends in substantially parallel relationship to the retaining element 44 of the first frame member. The other angle member 118 of the rear panel member 116 is disposed intermediate the first and second frame members 38 and 40, and rests at opposite ends on the rear support element 84 of the central frame member 76 and the support element of the fourth frame member 62. The two terminal elements 126 rests respectively on the rear support element 84 of the central frame member 76 and the support element of the fourth frame member 62.

The rear panel member 116 disposed adjacent the second frame member 40 is received in the rear panel enclosure 100 as follows: the side element of the angle member 118 disposed adjacent the second frame member 40 extends along the support element of the second frame member 40, and rests at opposite ends on the rear support element 84 of the control frame member 62. In this position, the side element extends in substantially parallel relationship to the retaining element of the second frame member 40. The other angle member 118 of the rear panel member 116 is disposed intermediate to the first and second frame members 38 and 40, and rests at opposite ends on the rear support element 84 of the central frame member 76 and the support element of the fourth frame member 62. The two terminal elements 126 rest respectively on the rear support element 84 of the central frame member 76 and the support element of the fourth frame member 62.

The front panel members 114 are received in the front panel enclosure 98 in a manner corresponding identically to that just described with reference to the rear panel member 116, except that the front support element 82 is substituted for the rear support element 84, and that the third frame member 60 is substituted for the fourth frame member 62. Thus, a side element of one front panel member rests on the front portion 78 of the support element 42 of the first frame member 38, and extends in substantially parallel relationship to the retaining element 44. In like manner, a side element of the other front panel member rests on the front portion 78 of the support element of the second frame member 40 and extends in substantially parallel relationship to the retaining element of the second frame member 40.

As best shown in FIGS. 3 and 5, when the panel members are received in their respective panel enclosures in the manner just described, the deck surfaces of the panel members cooperate to form a unitary deck surface. The panel members are sized so that the upper elements of the angle members of adjacent panel members in the same enclosure are closely adjacent to one another; thus there are no gaps between panel members intermediate the first and second panel members 38 and 40.

It will further be noted that the panel members are sized so that the terminal element of each panel member which rests on the support elements 82 and 84 is closely adjacent the terminal element of the panel member in the adjacent panel enclosure. Thus there are no gaps between the front and rear panel enclosures.

It will also be noted that the panels are sized to approximately the same depth as the retaining elements of the frame members. Thus there are no height discontinuities between the auxiliary bed and the ledge elements of the frame members. Further, it will be observed that the panel members are sized so that the upper element of an angle member resting on the support element of a frame member is closely adjacent the ledge element of that frame member. Thus there are no gaps between the frame members and the auxiliary deck.

Although the embodiment of FIGS. 3–9 shows a deck formed from four panel members, it will be understood that an auxiliary deck may be formed from a smaller number of panel members if it is not necessary that the auxiliary deck cover the entire bed 24 of the pickup truck 12. For example an auxiliary deck could be formed from the panels received in the front panel enclosure 98; in this instance, the fourth frame member 62 would not be necessary for support of the auxiliary deck, and could be removed if desired.

With reference to FIGS. 1, 3, 5, 6 and 7, a plurality of rod members 130, preferably comprising bolts, are secured to the first and second frame members 38 and 40. Each rod member 130 is insertable and extendable through collinear apertures formed in the closure member and retaining member of the frame member, and through a collinear aperture formed in the side element of the angle member of the panel member resting on the support element of the frame member. The rod member 130 may be held in its inserted position by a lock washer and nut assembly 132 on the opposite side of the closure member from the bolt head of the rod member 130.

From the foregoing, it will be appreciated that the rod member 130 may be inserted into the collinear apertures after the panel members have been received in the panel enclosures. This insertion can be accomplished from outside the deck-supporting enclosure defined by the retaining and support elements of the frame members by insertion of the rod members in the apertures formed in the closure members of the first and second frame members 38 and 40. In their inserted positions, the rod members 130 restrain vertical movement of the portion of each panel member disposed adjacent the first or second frame members. Removal of the rod members 130 releases the panels and permits free movement of the panel members (except to the extent that the second locking assembly 134, to be described hereafter, has been actuated). The rod members 130 thus function as a first locking assembly which is conveniently actuatable from outside the deck-supporting enclosure 58.

With reference to FIGS. 3 and 5, the second locking assembly 134 comprises a plurality of pin members 136 extending in parallel orientation to the third, fourth and central frame members 60, 62 and 76. A pin member 136 is disposed on each of the support elements of the third and fourth frame members 60 and 62 and on the front and rear support elements 82 and 84 of the central frame member 76. Each pin member 136 is maintained in a fixed position by a pair of holders 138.

Figure 9:
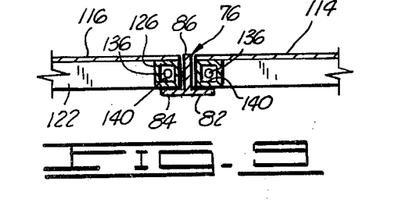
FIG. 9 is a cross-sectional view of the panel members shown in FIG. 8, taken along line 9—9.

With reference to FIGS. 8 and 9, it will be recalled that each panel member is formed from a framework which includes a terminal element formed from hollow tubing, which interconnects the angle members and cross elements at opposite ends thereof. As best shown in FIG. 9, the angle members are formed so that the side element does not overlie the opening of the hollow tubing comprising the terminal element. Thus, the two terminal elements in each panel member define two pairs of sockets 140—one pair disposed intermediate the first and second frame members 38 and 40, and one pair disposed adjacent either the first or second frame members. It will further be recalled that terminal elements rest on the support elements of each of the third, fourth and central frame members 60, 62 and 76; thus there are sockets adjacent the two edges of each panel which rest on support elements of the third, fourth or central frame members 60, 62 and 76.

One end of the pin member 136 disposed on each support element previously described is received in the socket 140 of a panel terminal element resting on that support member. The opposite end of the pin member is received in the socket of the terminal element of the other panel in the panel enclosure. It will be understood that two pins may be provided to engage the adjacent terminal elements resting on each support element, rather than opposite ends of the same pin, if desired.

From the foregoing it will be appreciated that the pin members 136 comprising the second locking assembly 134 operate to restrain vertical movement of portions of the panel members intermediate to the first and second frame members 38 and 40. When the ends of the pin members 136 are removed or released from the sockets 140, the panel members may move freely (subject to the action of the previously described first locking assembly).

The second locking assembly 134 must be actuated when the panels are being received in the panel enclosures. As each panel is received in the panel enclosure, the side to be disposed parallel and intermediate to the first and second frame members is lowered first until the pin members 136 engage the sockets 140 in the panel members. The side to be disposed adjacent the first or second frame member is then lowered until the panel is in place. Each panel member is installed in like manner; after each is installed, the first locking assembly may be actuated as required. Release of the second locking assembly proceeds in reverse manner to that just described.

In operation, the auxiliary deck may be constructed by first assembling the support assembly 10. It is expected that in many instances the first and second frame members and the first and second base members 30 and 36 may be permanently installed on the sidewalls 16 and 18, in order to facilitate rapid construction of the auxiliary deck. If the first and second frame and base members are not so installed, they must be installed as a first step. The combination of third, fourth and central frame members 60, 62 and 76 appropriate to the desired auxiliary deck configuration is then installed on the first and second frame members 38 and 40, as previously described. The brace members 102 and their associated portable jacks 111 are then assembled. The panel members are received in the deck-supporting enclosure defined by the frame members, so as to actuate the second locking assembly 134; after the panels have been received in the deck-supporting enclosure, the rod members 130 may be installed so as to actuate the first locking assembly.

Once the auxiliary deck is assembled in the manner described, it is capable of supporting cargo which may be transported by the pickup truck 112, at a height approximately equal to that of the truck sidewalls. Cargo load is transferred by the frame members to the sidewalls of the truck, and is transferred by the brace members 102 and 104 to the bed 24 of the truck. The auxiliary deck is stabilized against undesirable side-to-side, front-to-rear or rear-to-front movement of the deck by the retaining elements of the frame members. The auxiliary deck is stablized against undesirable vertical movement by the first and second locking assemblies.

It will be noted that a pickup truck is not limited to carrying cargo atop the auxiliary deck. In addition, as best shown in FIGS. 5 and 6, the cargo compartment of the pickup truck defined by the bed 24, sidewalls 16 and 18, and the auxiliary deck, may be utilized for reception of smaller cargo items.

Disassembly of the auxiliary deck of the present invention is accomplished by reversing the assembly steps just described.

Figure 10:
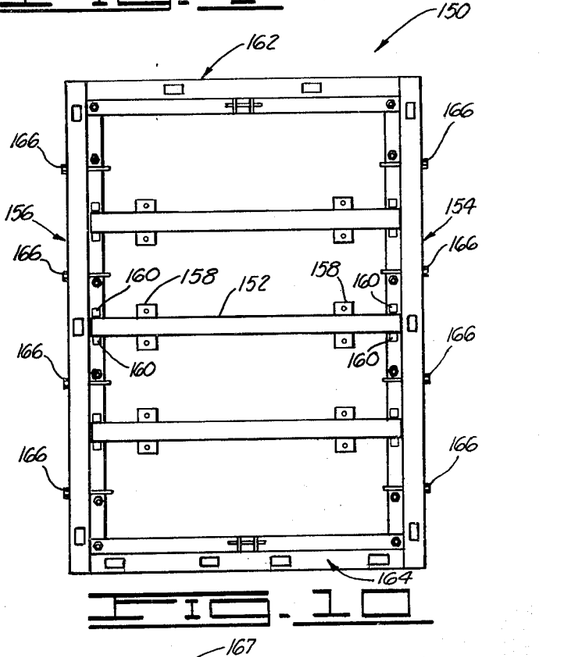
FIG. 10 is a plan view of the support assembly in another embodiment of an auxiliary deck, in which a unitary Panel is received in the support assembly.

FIG. 10 shows the support assembly 150 for another embodiment of auxiliary deck, which is formed as a unitary panel member, rather than as the four panel members described previously. A comparison of FIGS. 3 and 10 reveals that the support assembly 150 is identical in all respects to the support assembly 10, except that no central frame member is provided.

In lieu of a central frame member, the support assembly 150 is provided with a central brace member 152, identical in construction to the brace members 102 and 104 described with reference to FIGS. 3-9. The central brace member 152 bisects the first frame member 154 and the second frame member 156, just as the central frame member 76 bisected the frame members 38 and 40 in the embodiment shown in FIGS. 3-9.

Disposed on the underside of the central frame member 152 are a plurality of bracket members 158, identical in construction and disposition to the bracket members 110 described with reference to the front and rear brace members 102 and 104. A portable jack (not shown) is supported on the pickup truck bed beneath each bracket member 158, and is disposed in bracing engagement with the bracket member.

With continued reference to FIG. 10, front-to-rear and rear-to-front movement of the central brace member 152 is restrained by stop members 160. It will be noted that similar stop members are provided in the embodiment shown in FIGS. 1 and 3, adjacent the central frame member 76. Even though these stop members perform no function in the embodiment of FIGS. 1 and 3, provision of these stop members permits easy conversion of the support assembly 10 to the support assembly 150, by removal of the central frame member 76, and replacement with the central brace member 152.

The auxiliary deck received on the support assembly 150, although not shown in the Figures, is of essentially the same construction as the panel member shown in FIG. 4; however the panel member is enlarged so that it overlies the entire bed, rather than a quarter portion thereof. The two angle members of the auxiliary deck rest respectively on the support elements of the first frame member and second frame member 154 and 156. The two terminal elements of the auxiliary deck rest on the third frame member 162 and fourth frame member 164. Additional cross-bracing may be provided to the auxiliary deck, as required for strength and structural stability.

In the embodiment shown in FIG. 10, the auxiliary deck is restrained from vertical movement adjacent the first and second frame members 154 and 156 by a first frame assembly comprising a plurality of rod members 166, identical in construction and disposition to the rod members 130 previously described with reference to FIGS. 3-9. The rod members extend through a plurality of collinear sets of apertures formed in the closure element and restraining element of the frame member, and in the side member of the angle member resting on the support element of the frame member.

With reference to FIG. 10, pin members are shown on the support elements of the third and fourth frame members 162 and 164, disposed in the same position as the pin members 136 resting on the third and fourth frame members 60 and 62 in FIG. 3. These pin members perform no function in the embodiment of FIG. 10: since there is no juncture of adjoining panels intermediate the first and second frame members 154 and 156, there is no requirement for a second locking assembly such as that described with reference to FIGS. 3-9.

The pin members are provided in the embodiment of FIG. 10 in order to permit easy conversion of the support assembly 150 into the support assembly 10. An appropriately sized recess is formed in each of the terminal members of the auxiliary deck in order to permit the terminal members to rest on the support elements of the third and fourth frame members 162 and 164 without interfering with or engaging the pin members.

Assembly of the auxiliary deck shown in FIG. 10 is accomplished by essentially the same procedure described with reference to FIGS. 3-9. The frame members are first assembled, and the brace members and their associated portable jacks are then installed to complete the support assembly 150. The auxiliary deck is then lowered onto the support assembly 150, and the first locking assembly is actuated to restrain vertical movement of the auxiliary deck. Disassembly is accomplished by reversing these steps.

Although three brace members are shown in the embodiment of FIG. 10, it should be understood that a greater or smaller amount of brace members may be utilized, depending on the weight of the auxiliary deck and on the weight of the cargo to be supported by the auxiliary deck.

While the Figures show embodiments in which the auxiliary deck comprises four panel members and one panel member, it will be understood that decks comprising other number of panel members could be provided. For example, in the embodiment shown in FIGS. 3-9, the support assembly 10 could be retained, but two panel members could be provided rather than four panel members. In such an instance, one panel member would be received in the front panel enclosure, and the other panel member could be received in the rear panel enclosure.

Figure 11:
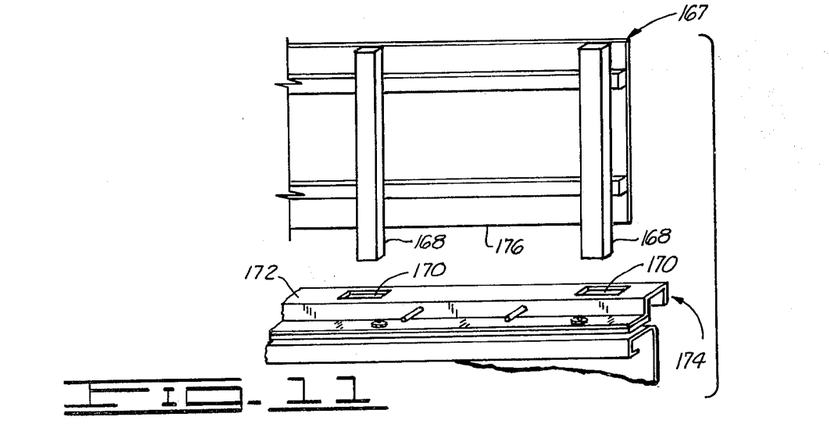
FIG. 11 is an elevational view of an auxiliary side element, in preparation for the reception of its projecting leg members in the frame pockets of a frame member.

It will be recalled that in the embodiments described with reference to FIGS. 1-10, the ledge elements of each frame member have been characterized by openings which communicate with upwardly opening frame pockets. Turning now to FIG. 11, the operation of these frame pockets will be described.

Shown in FIG. 11 is an auxiliary side element 167 having a plurality of projecting leg members 168. The auxiliary side element 166 may comprise a solid wall member, as shown in FIG. 11, or it may comprise an open framework member, of the type used in stock racks. The projecting leg members 168 may be clearingly lowered and received into the frame pockets 170 formed in the ledge element 172 of a frame member 174, which may be either the first, second, third or fourth frame member; auxiliary side elements may be lowered into any of the four frame members, or into any combination thereof or into all of them.

When received in the frame pockets 170, the leg members 168 may be held in place by bolts (not shown) interengaging the leg member and the walls of the frame pocket 170. In this position the lower wall portion 176, if any, of the auxiliary side element 167 rests on the ledge element 172, thus providing a substantially weather-proof contact. From the foregoing, it will be appreciated that the frame pockets disposed in each frame member cooperate to form a side-supporting structure, in which an auxiliary side element may be received and supported in a vertical position. The support assemblies 10 and 150 thus each perform a dual function: support of an auxiliary deck, and support of auxiliary side elements.

Figure 12:
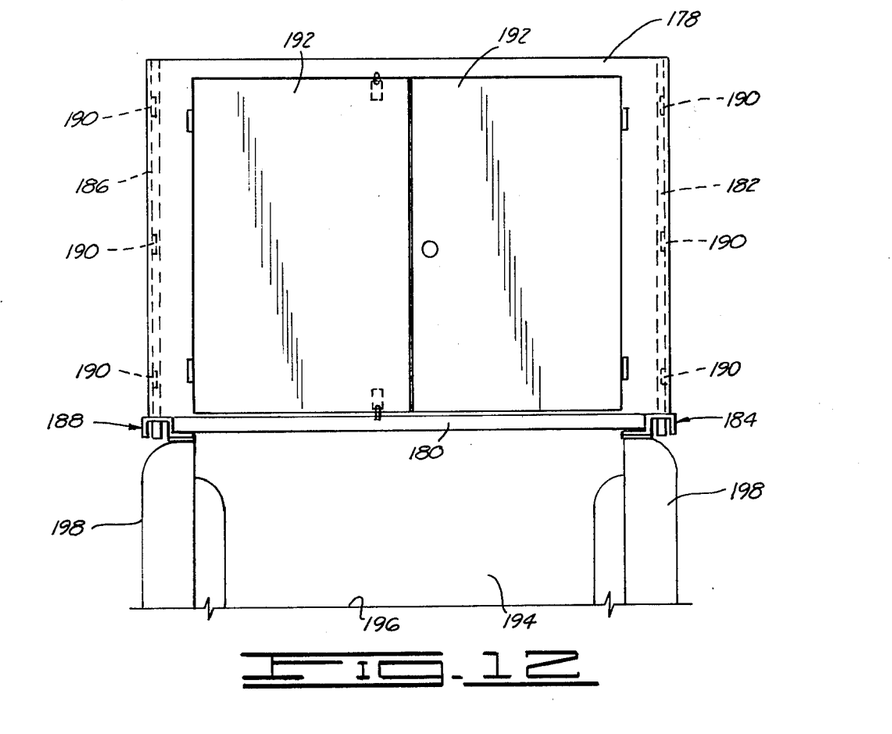
FIG. 12 is an elevational view of one type of auxiliary side element supported on the rear of a pickup truck in accordance with the present invention.

FIG. 12 shows an embodiment of the present invention in which a rear side element 178 is supported by the fourth frame member 180, a first side element 182 is supported by the first frame member 184, a second side element 188 is supported by the second frame member 190, and a front side element (not shown) is supported by the third frame member (not shown). Adjacent side elements are secured to one another by connectors 190, so that the side elements form a four-sided enclosure. A roof element (not shown) may be conventionally secured to the upper edges of the side elements in order to completely weatherproof the enclosure formed by the side members; the roof element may comprise a flexible member; such as canvas, or a rigid member similar in construction to the side elements.

In the embodiment shown in FIG. 12, it is contemplated that the auxiliary deck will be in its assembled and installed position. Access to the auxiliary deck is provided by doors 192 formed in the rear side element 178. Cargo may be received in the enclosure defined by the side elements, and may rest on the auxiliary deck. Additional cargo may be received in the cargo compartment 194 disposed beneath the deck, and defined by the bed 196 and side walls 198.

Figure 13:
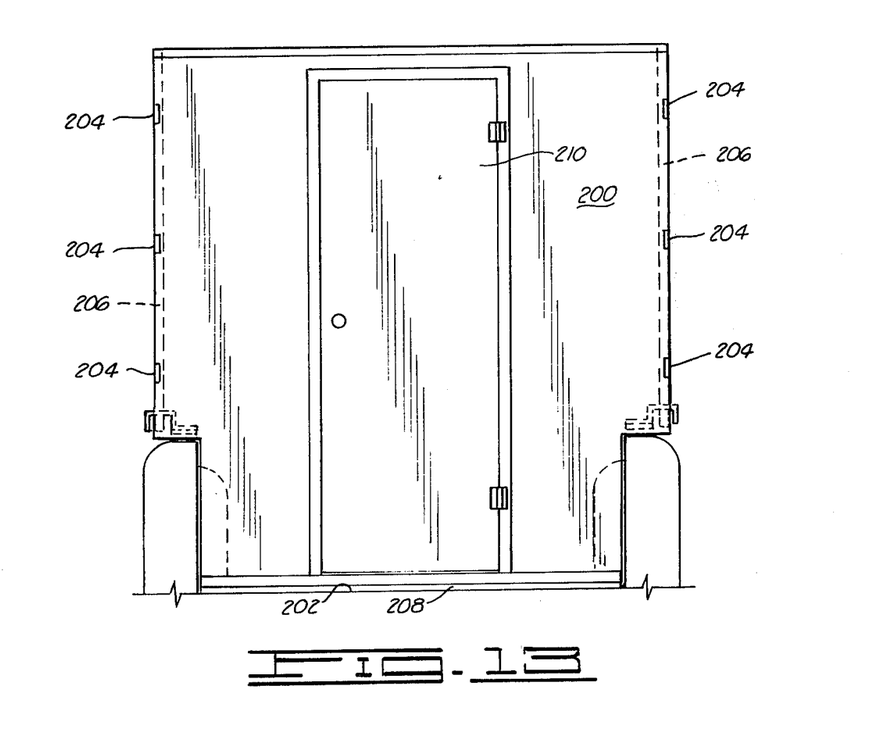
FIG. 13 is an elevational view of another type of auxiliary side element supported on the rear of a pickup truck in accordance with the present invention.

FIG. 13 shows an embodiment of the present invention similar to that shown in FIG. 12. The front, first and second side elements are supported by the first, second and third frame members, as previously described with reference to FIG. 12. If desired, a roof element may also be provided. The fourth frame member has been removed, however, and the fourth side element 200 extends adjacent the bed 202. The fourth side element 200 is held in position by connectors 204 which secure it to the adjacent first and second side members 206. If required, an insert member 208 is provided to close any opening between the fourth side element 200 and the bed 202.

In the embodiment shown in FIG. 13, it is contemplated that the auxiliary deck will not be received in the support assembly if the unitary deck of FIG. 10 is used. If the first panel member deck of FIGS. 3-9 is used, it is contemplated that the auxiliary deck will not be assembled, or that only the portion of the deck received in the front panel enclosure will be assembled. Because of the absence of the auxiliary deck adjacent the rear portion of the truck, the embodiment of FIG. 13 defines a somewhat larger enclosure than that available in the embodiment of FIG. 12. Access to this enclosure, for cargo or passengers, is provided by a door 210 formed in the fourth side element 200.

Changes may be made in the construction and operation of the various parts, elements and assemblies described herein without departing from the spirit and scope of the invention as defined in the following claims.

What is claimed is:

1. A support apparatus for an auxiliary deck and auxiliary side elements having projecting leg members in a pickup truck of the type having a pair of opposed first and second sidewalls each having an upper surface, comprising:
    a first frame member supported by the upper surface of the first sidewall, comprising:
        a support element, having a generally horizontal support surface;
        a retaining element, having a generally vertical retaining surface disposed in transverse engagement with the support element; and
        a plurality of upwardly opening frame pockets disposed adjacent the retaining element, in non-overlying relationship to the support element;
    a second frame member supported by the upper surface of the second sidewall,
    comprising:
        a support element, having a generally horizontal support surface;
        a retaining element, having a generally vertical retaining surface, disposed in transverse engagement with the support element; and
        a plurality of upwardly opening frame pockets disposed adjacent the retaining elements in non-overlying relationship to the support element;
    the support and retaining elements of the first and second frame members forming a deck-supporting enclosure in which the auxiliary deck may be clearingly lowered and received; and
    the frame pockets of each frame member forming a side-supporting structure in which the projecting leg members of the auxiliary side elements may be clearingly lowered and received.

2. The apparatus of claim 1, further comprising:
    a first base member secured to the first sidewall and having a planar platform element resting on the upper surface of the first sidewall; and
    a second base member secured to the second sidewall and having a planar platform element resting on the upper surface of the second sidewall; and
in which the support element of the first frame member rests upon, and is secured to, the platform element of the first base member, and in which the support element of the second frame member rests upon, and is secured to, the platform element of the second base member.

3. The apparatus of claim 2 in which each sidewall of the pickup truck is characterized as having sidewall pockets formed therein, and in which each base member further comprises:
    a plurality of insert members extending from the platform element, each insert member being removably receivable in a corresponding sidewall pocket.

4. The apparatus of claim 1 in which the support element and the retaining element of each frame member are in edgewise engagement, and in which each frame member further comprises:
    a ledge element, disposed in edgewise engagement with the retaining element, and having a plurality of openings formed therein, each opening communicating with a corresponding frame pocket.

5. An auxiliary deck for a pickup truck of the type having a cargo compartment defined by a bed, a front wall and a pair of opposed first and second sidewalls each having an upper surface, comprising:
    a support assembly, comprising:
        a first frame member supported by the upper surface of the first sidewall and having a support element, having a generally horizontal support surface, and a retaining element, having a generally vertical retaining surface, disposed in transverse engagement with the support element;

a second frame member supported by the upper surface of the second sidewall and having, a support element, having a generally horizontal support surface, and a retaining element having a generally vertical retaining surface, disposed in transverse engagement with the support element;

a third frame member supported at opposite ends by the first and second frame members, disposed adjacent the front wall of the pickup truck, and having a support element, having a generally horizontal support surface, and a retaining element, having a generally vertical retaining surface, disposed in transverse engagement with the support element; and a fourth frame member supported at opposite ends by the first and second frame members, positioned remotely from the front wall of the pickup truck, and having a support element, having a generally horizontal support surface, and a retaining element having a generally vertical retaining surface, disposed in transverse engagement with the support element in which the support and retaining elements of the first, second, third and fourth frame members form a deck supporting enclosure; a plurality of upwardly opening frame pockets disposed adjacent the retaining element of the deck supporting enclosure in non-overlying relationship to the support element thereof; and the auxiliary deck supportingly received in the deck-supporting enclosure formed by the support assembly.

6. The apparatus of claim 5 in which the cargo compartment of the pickup truck is further defined by a rear gate, and in which the fourth frame member is disposed adjacent the rear gate of the pickup truck.

7. The apparatus of claim 6, further comprising:
first locking means actuatable from outside the deck-supporting enclosure, for releasably restraining movement of portions of the auxiliary deck adjacent the first and second frame members.

8. The apparatus of claim 7 in which the auxiliary deck is characterized as having side elements which rest on the support surfaces of the frame members, and which extend in substantially parallel relationship to the retaining elements of the frame members, and in which the retaining elements of the first and second frame members are characterized as having a plurality of apertures formed therein, each aperture being disposed in collinear relationship to an aperture formed in an adjacent side element of the auxiliary deck, and in which the first locking means comprises:

a plurality of rod members releasably extendable through each pair of collinear apertures in each retaining element and side element.

9. The apparatus of claim 6 in which the auxiliary deck comprises four panel members and in which the support assembly further comprises:
a central frame member supported at opposite ends by the first and second frame members, disposed intermediate to the front wall and rear gate of the pickup truck, and having a front support element, a rear support element, and a retaining element, the central frame member dividing the first and second frame members into front and rear portions;

the front support element and the retaining element of the central frame member, the support and retaining elements of the third frame member, and the front portions of the support and retaining elements of the first and second frame members forming a front panel enclosure in which two panel members may be supportingly received; and the rear support element and the retaining element of the central frame member, the support and retaining elements of the fourth frame member and the rear portions of the support and retaining elements of the first and second frame members forming a rear panel enclosure in which two panel members may be supportingly received.

10. The apparatus of claim 9, further comprising:
first locking means for releasably restraining movement of portions of the panel members adjacent the first and second frame members; and second locking means for releasably restraining movement of portions of the panel members intermediate to the first and second frame members.

11. The apparatus of claim 9, further comprising:
locking means for releasably restraining movement of portions of the panel members intermediate to the first and second frame member.

12. The apparatus of claim 11 in which each panel member is characterized as having a pair of sockets formed therein, the sockets disposed adjacent the two edges of each panel which rest on the support elements of the central, third or fourth frame members, each socket being disposable substantially intermediate to the first and second frame members, and in which the second locking means comprises:
a plurality of pin members separately supported on each of the central, third and fourth frame members, each pin member disposed intermediate to the first and second frame members and receivable in a corresponding socket of a panel member.

13. The apparatus of claim 5 in which the cargo compartment of the pickup truck is further defined by a rear gate, in which the auxiliary deck comprises at least two panel members, and in which a fourth frame member is disposed intermediate to the rear gate and the front wall of the pickup truck.

* * * * *